Patented May 1, 1951

2,551,421

UNITED STATES PATENT OFFICE 2,551,421

REACTION OF VINYL ETHERS WITH THIOLS

John W. Copenhaver, Easton, Pa., assignor to General Aniline & Film Corporation, New York, N. Y., a corporation of Delaware No Drawing. Application October 26, 1946, Serial No. 706,043

7 Claims. (Cl. 260—609)

The present invention relates to a process for reacting vinyl ethers with mercaptans in the presence of acidic catalysts, and to the products thus obtained.

It has been found that vinyl ethers readily react with mercaptans in the presence of an acidic catalyst to form products having the following general formula:

*Formula A*

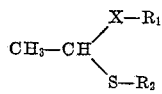

in which X is a chalcogen of atomic weight less than 33 (i. e. oxygen or sulphur) and $R_1$ and $R_2$ are monovalent radicals selected from the group consisting of alkyl, aryl, aralkyl or alkaryl radicals and oxygen- or sulphur-interrupted hydrocarbon radicals or $R_1$ and $R_2$ together may form a bivalent hydrocarbon radical. The compounds of this general formula, in which X is oxygen are, as is more fully described hereinafter, formed as a final or intermediate product in the practice of this invention and are novel compounds.

In practicing the present invention, a mercaptan and a vinyl ether are reacted in the presence of an acid-reacting catalyst, the reaction proceeding as outlined in the following equations:

*Equation I*

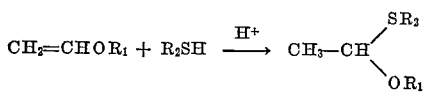

*Equation II*

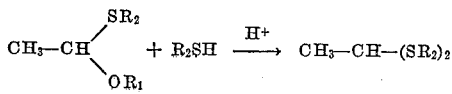

wherein $R_1$ and $R_2$ are as previously defined.

A wide variety of acidic catalysts are suitable for the present process and examples of suitable catalysts include mineral acids such as sulphuric acid, phosphoric acid, hydrochloric acid; the aromatic sulphonic acids such as benzene sulphonic acid and p-toluene sulphonic acid, and substances having an acid reaction such as α-chloroethyl ether. The acid catalysts are employed preferably in small amounts from 0.1% to 5% by weight, based on the weight of the vinyl ether employed. Since both the vinyl ether and mercaptals which may be formed in the reaction are readily hydrolyzable in acid solution, it is desirable to carry out the reaction under substantially anhydrous conditions. However, if desired, various inert diluents such as diethyl ether, low boiling hydrocarbons such as petroleum ether and the like, may be employed. The use of such inert diluents is particularly desirable in case one of the reactants is normally gaseous under the reaction conditions.

No critical limits for the temperature of the reaction have been established, temperatures from —65° C. to 100° C. or even higher having been found to be operative. Generally, however, temperatures within the range of —5° C. to 25° C. are preferred. The process may advantageously be carried out at atmospheric pressure. However, in the event that the temperature employed for the reaction is above the boiling point of either the vinyl ether or the thiol to be reacted, superatmospheric pressure is then preferebly employed to keep the reactants in liquid phase.

Likewise, it is apparent that the proportions of the reactants (i. e. the vinyl ether and the thiol) are not critical and can therefore be varied over a considerable range. In order to obtain complete reaction of the vinyl ether, at least equivalent amounts of vinyl ether and thiol will be employed, but the reaction is operative when a substantial excess of vinyl ether is employed. However, too great an excess of vinyl ether is preferably avoided, since it constitutes only an unnecessary load in the system. If the desired product is a mercaptal, it will be apparent that some excess of thiol will be employed, 2 molar proportions of thiol to each mol of vinyl ether being necessary for complete conversion. However, larger amounts of thiol do not interfere with the process, but are unnecessary since they only constitute an extra load.

The following examples, in which the parts are by weight, are illustrative of this invention:

*Example 1*

To a glass reaction vessel fitted with a stirrer, reflux condenser and thermometer and containing 120 parts of absolute diethyl ether cooled to 0° C., was added 116 parts of methyl vinyl ether and 2 parts of α-chloroethylmethylether. To this cooled solution was added 124.2 parts of ethyl mercaptan dropwise over a period of 1.5 hours, while maintaining the temperature of the reaction mixture at 0–5° C. After the addition of the mercaptan was complete, the solution was allowed to warm to room temperature and stirred for an additional half hour. To this solution was added 10 parts of tributylamine to neutralize the catalyst and the reaction mixture was then distilled to obtain 87 parts of methyl ethylthiol acetal boiling at 130–132° C. and 46 parts of diethyl mercaptal boiling at 77° C./13 mm.

*Example 2*

To a mixture of 390 parts of mercaptoethanol and 4 parts of p-toluenesulfonic acid, in a glass reactor similar to that employed in Example 1, was added 300 parts of methyl vinyl ether during a period of 4.75 hours while maintaining the temperature within the range of 0–10° C. The temperature was then allowed to warm up to room temperature during the course of about 1 hour. The acidic catalyst was neutralized by the addition of 5 parts of anhydrous potassium carbonate. The reaction product was then distilled to obtain 150 parts of 2-methyl-1,3-thioxolane boiling at 129° C.

While the foregoing examples illustrate the preferred embodiments of the invention, it will be understood that the various process variables (such as the amount and type of catalyst, temperature and proportions of the reactants) may be varied within the limits previously described. It will likewise be apparent with this process that only vinyl ethers of the formula $CH_2=CH-OR_1$ wherein $R_1$ is the same as previously defined, may be employed in place of the methyl vinyl ether specified in the foregoing examples. As examples of other alkyl, aryl, aralkyl or alkaryl vinyl ethers which may replace the methyl vinyl ether may be mentioned such compounds as ethyl vinyl ether, isopropyl vinyl ether, isobutyl vinyl ether, lauryl vinyl ether, stearyl vinyl ether, phenyl vinyl ether, cresyl vinyl ether, benzyl vinyl ether, $\beta$-methoxy-ethyl vinyl ether and $\beta$-methoxy-thioethyl vinyl ether. The product obtained will, of course, correspond with the particular vinyl ether employed as indicated in Equations I and II above.

Likewise, the process described in the foregoing examples (or permissible modifications thereof) is applicable to a wide variety of thiols, the particular thiol employed depending and corresponding, of course, to the particular product which is desired as indicated in Equations I and II above. As examples of thiols which may be employed may be mentioned the aliphatic thiols (such as methyl, ethyl, propyl, isopropyl, n-butyl, isobutyl, amyl, octyl, lauryl and stearyl mercaptans); also aromatic and araliphatic thiols (such as phenyl mercaptan, $\alpha$- and $\beta$-naphthyl mercaptans, cresyl mercaptans and benzyl mercaptans) and, if desired, dithiols (such as ethane dithiol, 1,2- and 1,3-propane dithiols, and 1,3-butane dithiols. In this case, it will be noted that $R_1$ and $R_2$ in Formula A above will form a bivalent hydrocarbon radical. Various mercapto alcohols may also be employed, such as $\beta$-mercaptoethanol, $\gamma$-mercaptopropanol, $\beta$-mercaptobutanol and $\gamma$-mercaptobutanol.

The products of this invention are useful as solvents, softening agents, intermediates for further synthesis, e. g. for the preparation of resinous materials, pharmaceuticals, etc.

I claim:

1. The process of producing compounds of the formula:

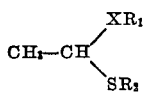

wherein X is a member of the group consisting of oxygen and sulfur and $R_1$ and $R_2$ are members of the group consisting of monovalent radicals of the group consisting of alkyl, aryl, aralkyl and alkaryl radicals, and $R_1$ and $R_2$ together may be bivalent hydrocarbon radicals, which comprises contacting a mercaptan with a monovinyl ether in the presence of an acid catalyst.

2. The process of producing compounds of the formula:

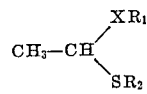

wherein X is a member of the group consisting of oxygen and sulfur and $R_1$ and $R_2$ are members of the group consisting of monovalent radicals of the group consisting of alkyl, aryl, aralkyl and alkaryl radicals, and $R_1$ and $R_2$ together may be bivalent hydrocarbon radicals, which comprises contacting a mercaptan with an aliphatic monovinyl ether in the presence of an acid catalyst and under substantially anhydrous conditions.

3. The process of producing compounds of the formula:

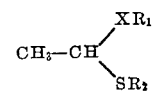

wherein X is a member of the group consisting of oxygen and sulfur and $R_1$ and $R_2$ are members of the group consisting of monovalent radicals of the group consisting of alkyl, aryl, aralkyl and alkaryl radicals, and $R_1$ and $R_2$ together may be bivalent hydrocarbon radicals, which comprises contacting a mercaptan with a lower alkyl vinyl ether in the presence of an acid catalyst and under substantially anhydrous conditions.

4. The process of producing compounds of the formula:

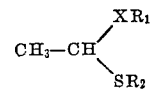

wherein X is a member of the group consisting of oxygen and sulfur and $R_1$ and $R_2$ are members of the group consisting of monovalent radicals of the group consisting of alkyl, aryl, aralkyl and alkaryl radicals, and $R_1$ and $R_2$ together may be bivalent hydrocarbon radicals, which comprises contacting an aliphatic thiol with an aliphatic monovinyl ether in the presence of an acid catalyst and under substantially anhydrous conditions.

5. The process of producing compounds of the formula:

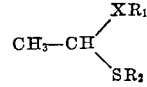

wherein X is a member of the group consisting of oxygen and sulfur and $R_1$ and $R_2$ are members of the group consisting of monovalent radicals of the group consisting of alkyl, aryl, aralkyl and alkaryl radicals, and $R_1$ and $R_2$ together may be bivalent hydrocarbon radicals, which comprises contacting a lower aliphatic thiol with an aliphatic monovinyl ether in the presence of an acid catalyst and under substantially anhydrous conditions.

6. The process of producing compounds of the formula:

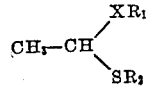

wherein X is a member of the group consisting of oxygen and sulfur and R₁ and R₂ are members of the group consisting of monovalent radicals of the group consisting of alkyl, aryl, aralkyl and alkaryl radicals, and R₁ and R₂ together may be bivalent hydrocarbon radicals, which comprises contacting a lower alkyl thiol with a lower aliphatic vinyl ether in the presence of an acid catalyst and under substantially anhydrous conditions.

7. Compounds of the formula:

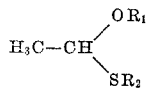

wherein R₁ and R₂ stand for a member of the group consisting of the same and different monovalent alkyl, aryl, aralkyl and alkaryl radicals and together may comprise a bivalent hydrocarbon radical.

JOHN W. COPENHAVER.

REFERENCES CITED

The following references are of record in the file of this patent:

UNITED STATES PATENTS

| Number | Name | Date |
|---|---|---|
| 2,191,564 | Graenacher et al. | Feb. 27, 1940 |
| 2,352,435 | Hoeffelman et al. | June 27, 1944 |
| 2,390,099 | Harmon | Dec. 4, 1945 |
| 2,392,294 | Rust et al. | Jan. 1, 1946 |
| 2,412,814 | Kendall et al. | Dec. 17, 1946 |
| 2,422,341 | Crouch | June 17, 1947 |

OTHER REFERENCES

Levi: "Gazzette Chim. It.," vol. 62, page 775.
Ipatieff et al.: Jour. Am. Chem. Soc., vol. 60, 273–4 (1938).